UNITED STATES PATENT OFFICE 2,955,951
Patented Oct. 11, 1960

2,955,951

NON-TACKY ACID SALTS OF POLYAMIDE RESINS

David Aelony, Minneapolis, Minn., assignor to General Mills, Inc., a corporation of Delaware No Drawing. Original application Jan. 11, 1956, Ser. No. 558,403, now Patent No. 2,908,584, dated Oct. 13, 1959. Divided and this application Apr. 27, 1959, Ser. No. 808,915

4 Claims. (Cl. 106—287)

This invention relates to new and novel compositions of matter composed of polyamide resins and polybasic acids.

The primary object of this invention is to disclose new and novel compositions suitable as heat sealing thermoplastic adhesives. A further object of this invention is to disclose heat sealing adhesives that do not block at room temperature or temperatures slightly above room temperatures. The term "block" indicates a tendency of two sheets of paper, wood, metal, etc. to adhere to each other i.e., stickiness.

The compositions of this invention are composed of polyamides containing free and unreacted amino radicals in admixture with weak polybasic acids. These compositions are non-tacky salts at room temperature which upon heating dissociate into polyamide and polybasic acid thereby becoming extremely sticky.

The polyamides employed in this invention are those resulting from the reaction of polymeric fat acids and an excess of polyamines. Polymeric fat acids are prepared by polymerizing unsaturated fatty acids such as linoleic and linolenic. The resulting polymeric fat acids from the polymerization of these fatty acids are principally dimers and trimer.

The polyamines employed in the preparation of the polyamides are those having the general formula,

$$H_2N(RNH)_nH$$

where R is an alkylene radical and $n$ is an integer less than 6 and is preferably in the range of 2 to 4. Illustrative of these polyamines are ethylene diamine, diethylene triamine, triethylene tetramine, tetraethylene pentamine and so forth or any mixture thereof.

The term "polyamides" as used in this specification is intended to be restricted to polyamides of the above type which have free and unreacted amino groups. These free amino groups may be either primary or secondary amine groups and in actual practice will generally be a mixture of primary amine and secondary amine groups. They may further be characterized as polyamides having an amine number of 40 to 200, the amine number being an expression of the number of milligrams of potassium hydroxide equivalent to the free amine groups in a one gram sample.

Polybasic acids, having a relatively low acid equivalent weight and a relatively low dissociation constant for the first hydrogen, are mixed with these polyamides to produce the compositions utilized in this invention. Succinic, citric, tartaric, oxalic, fumaric and boric acids are illustrative of this type of acid. Mixtures of two or more polybasic acids may also be advantageous in special applications. Generally speaking, polybasic acids having an acid equivalent weight of from 25 to 100 and a dissociation constant for the first hydrogen of $10^{-1}$ to $10^{-11}$ may be employed. These acids might further be characterized as low molecular weight polybasic acids of carbon or boron, or, in other words low molecular weight acids in which the acidic OH is attached directly to elements having an atomic number of 5 to 6 inclusive.

The polyamides may be mixed with the polybasic acids in the absence or presence of a volatile solvent, diluent or carrier. If only polyamides and polybasic acids are employed, they may be applied to any surface in the form of a hot melt. Other methods are suitable for applying the two principal components (polyamides and polybasic acids) to all types of surfaces at room temperature. In this regard the polyamides may be employed in the form of aqueous suspensions. This method and type of composition form the preferred embodiment of this invention.

Aqueous polyamide suspensions may be prepared by vigorously agitating polyamides and water in the presence of a small amount of a weak acid. Illustrative suspensoids are those containing 30 to 60 percent polyamides and 40 to 70 percent water in admixture with acetic acid approximately equivalent to from 0.1 to 0.2 of the free and unreacted amino groups present in the polyamide.

The mixtures envisioned by this invention contain about one mol of polybasic acid per equivalent of free and unreacted amino group in the polyamide. In such mixtures the acid salts of the polyamides result and are preferred because of their higher melting point than the corresponding full salt. However, good results are obtained when $\frac{2}{3}$ to $1\frac{1}{3}$ mols of polybasic acid per equivalent of free and unreacted amino radical in the polyamide is employed.

This invention may be illustrated further by reference to the following examples.

*Example I*

200 gm. of a polyamide, having an amine number of 90, prepared by reacting polymeric fat acids and diethylene triamine, 198 ml. of water and 1.0 ml. of glacial acetic acid were heated to 130° C. in a 1 liter stainless steel autoclave. A stable suspensoid resulted after this mixture was agitated for 30 minutes at 1000 r.p.m. with a shearing type agitator.

20 gm. of this polyamide suspensoid was mixed with a solution containing 2 gm. of oxalic acid dihydrate in 26 ml. of water. The resulting product was a thin suspension which dried fast upon being applied to paper. Paper coated in this manner was tested for heat sealing properties. No sealing was observed up to 50° C. Above 50° C. sealing was observed and the best seal was observed between 80 and 120° C.

*Example II*

20 gm. of the polyamide suspensoid shown in Example I was mixed with 2.3 gm. of tartaric acid in 26.7 gm. of water. The resulting suspension had a consistency similar to mayonnaise. The suspension dried rapidly upon being applied to paper and the coated paper had good heat sealing characteristics. No sealing took place below 50° C. and optimum heat sealing temperatures were in the range of 90 to 130° C. Additional tests showed that layers of papers coated with this composition would not block, i.e., layers stick together, under pressure until the temperature reached 60° C.

*Example III*

Two samples (20 grams each) of the polyamide suspension prepared as in Example I were mixed with 2.25 and 3.25 gm. of citric acid monohydrate in 26.75 gm. of water.

The sample containing 2.25 grams of citric acid monohydrate when applied to paper had a sealing range of 70 to 110° C.

The sample containing 3.25 gm. of citric acid monohydrate was quite thick and when applied to paper dried fast to produce a tack free coating. The paper coated in this manner sealed well in the range of 70 to 130° C.

*Example IV*

20 gm. of the polyamide suspension prepared as in Example I was mixed with 1 gm. of boric acid in 12.3 gm. of water. This suspension, when applied to paper, had a heat sealing range of 50 to 90° C.

*Example V*

5 gm. of oxalic acid dihydrate dissolved in 40.3 ml. of water was mixed with 80 gm. of a mixture of two different polyamide suspensions. The mixture of polyamide suspensions was prepared by mixing 50 gm. of the suspension prepared as shown in Example I with 30 gm. of another suspension which was prepared following the procedure described in Example I except that a polyamide having an amine number of 5 was used. This polyamide was prepared by reacting polymeric fat acids and ethylene diamine in the conventional manner.

This mixture dried rapidly upon application to paper and had a heat sealing range of from 70 to 120° C.

Paper coated with this composition did not block front to back or front to front after being subjected to a pressure of 0.5 pound per square inch for 24 hours at 60° C. and 100% relative humidity.

The unused portion of this suspension was found to be stable at the end of 40 days.

*Example VI*

50 grams of a polyamide, having an amine number of 90, prepared from polymeric fat acids and diethylene triamine, 40 grams of a polyamide, having an amine number of 5, prepared from polymeric fat acids and ethylene diamine, and 10 grams of oxalic acid dihydrate were heated to 130° C. with agitation. The hot mixture was applied to paper and upon cooling the coated paper was not tacky and did not block at temperatures under 50° C.

Thus, the compositions of this invention are useful as heat sealing thermoplastic adhesives. They are also adhesives for a wide variety of substances which vary greatly in their physical make-up. As such they may be used as an adhesive for a wide variety of surfaces such as glass, paper, metal, wood, plastics, or any combination thereof. Many other uses and applications for the compositions of this invention are apparent and obvious. Therefore, only limitations such as those indicated in the appended claims should be imposed.

This application is a division of U.S. application Serial No. 558,403, now U.S. Patent No. 2,908,584.

Now, therefore, I claim:

1. Compositions of matter useful as thermoplastic adhesives composed of polyamides having an amine number in the range of 40–200 and being derived from polymeric fatty acids selected from the group consisting of polymerized linoleic and linolenic acid and a polybasic amine of the formula $H_2N(RNH)_nH$ where R is an alkylene radical and $n$ is an integer less than 6 having free and unreacted amino radicals and boric acid, said boric acid being employed in a mol ratio of $2/3$–$1\frac{1}{3}$ per equivalent of free and unreacted amino radicals.

2. Compositions of claim 1 in which said polyamides are employed in the form of aqueous suspension containing 30 to 60 percent of said polyamides.

3. The compositions of claim 1 in which R is an alkylene radical and $n$ is in the range of 2 to 4.

4. The compositions of claim 1 in which said polyamides have an amine number in the range of 60–150.

References Cited in the file of this patent

UNITED STATES PATENTS

| | | |
|---|---|---|
| 2,609,380 | Goldstein | Sept. 2, 1952 |
| 2,728,737 | Wittcoff | Dec. 27, 1955 |
| 2,768,090 | Wittcoff | Oct. 23, 1956 |

FOREIGN PATENTS

| | | |
|---|---|---|
| 493,121 | Canada | May 20, 1953 |

OTHER REFERENCES

Cowan et al.: Oil and Soap, April 1944, pages 101–107.